United States Patent
Maloney et al.

(10) Patent No.: US 11,308,019 B2
(45) Date of Patent: Apr. 19, 2022

(54) SYSTEMS AND METHODS FOR DOOR AND DOCK EQUIPMENT SERVICING

(71) Applicant: D. H. PACE COMPANY, INC., Olathe, KS (US)

(72) Inventors: Mike Maloney, Prairie Village, KS (US); Amir Kashani, Irvine, CA (US); William A. Snead, Topeka, KS (US); William James McGrath, Fullterton, CA (US); Eric Poulsen, Aliso Viejo, CA (US)

(73) Assignee: D. H. Pace Company, Inc., Olathe, KS (US)

( * ) Notice: Subject to any disclaimer, the term of this patent is extended or adjusted under 35 U.S.C. 154(b) by 14 days.

(21) Appl. No.: 16/877,786

(22) Filed: May 19, 2020

(65) Prior Publication Data

US 2020/0379938 A1 Dec. 3, 2020

Related U.S. Application Data

(60) Provisional application No. 62/984,032, filed on Mar. 2, 2020, provisional application No. 62/854,455, filed on May 30, 2019.

(51) Int. Cl.
*G06F 13/42* (2006.01)
*G06F 13/40* (2006.01)
(Continued)

(52) U.S. Cl.
CPC .... *G06F 13/4068* (2013.01); *H04L 12/40013* (2013.01); *H04L 67/12* (2013.01);
(Continued)

(58) Field of Classification Search
CPC ........... G06F 13/4068; H04L 12/40013; H04L 67/12; H04L 67/141; H04L 67/303
(Continued)

(56) References Cited

U.S. PATENT DOCUMENTS

| 5,884,237 A | 3/1999 | Kanki et al. |
| 6,392,537 B1 | 5/2002 | Tazumi et al. |

(Continued)

FOREIGN PATENT DOCUMENTS

| EP | 1713711 B1 | 6/2010 |
| WO | 2012017411 A1 | 2/2012 |

OTHER PUBLICATIONS

"Gate Monitoring System." Comlink. Feb. 27, 2018. Accessed Jan. 9, 2019. https://www.comlinksweden.com/grindar/.
(Continued)

*Primary Examiner* — Chun Kuan Lee
(74) *Attorney, Agent, or Firm* — Hovey Williams LLP

(57) ABSTRACT

A method for monitoring automatic mechanical devices selected from at least one of automatic doors and automatic dock equipment located at a commercial site. The method may include installing, at the commercial site, a plurality of internet-of-things (IoT) monitoring devices. Each of the IoT monitoring devices may include a plurality of connectors corresponding to respective data communication standards, and a wireless transceiver configured to transmit operational information. Electronic communication between each automatic mechanical device and one of the IoT monitoring devices may be established via one of the connectors. A device profile may be assigned for each of the automatic mechanical devices. Each device profiles defines a respective connector and combination of manufacturer and device model. Data reflecting operational events and states of the automatic mechanical devices is received over the connectors, and corresponding operational information relating to the automatic mechanical devices is transmitted for analysis.

20 Claims, 8 Drawing Sheets

(51) Int. Cl.
*H04L 67/12* (2022.01)
*H04L 67/303* (2022.01)
*H04L 12/40* (2006.01)
*H04L 67/141* (2022.01)
*G16Y 10/75* (2020.01)
*G16Y 40/10* (2020.01)

(52) U.S. Cl.
CPC .......... *H04L 67/141* (2013.01); *H04L 67/303* (2013.01); *G06F 2213/0002* (2013.01); *G16Y 10/75* (2020.01); *G16Y 40/10* (2020.01)

(58) Field of Classification Search
USPC ........................................................ 710/105
See application file for complete search history.

(56) References Cited

U.S. PATENT DOCUMENTS

| | | | |
|---|---|---|---|
| 6,516,923 B2 | 2/2003 | Barreiro et al. |
| 6,553,238 B1 | 4/2003 | Ginzel et al. |
| 6,543,583 B1 | 5/2003 | Barreiro et al. |
| 6,636,814 B1 | 10/2003 | McCullers et al. |
| 6,792,321 B2 | 9/2004 | Sepe, Jr. |
| 6,933,843 B1 | 8/2005 | Hom et al. |
| 6,998,977 B2 | 2/2006 | Gregori et al. |
| 7,161,319 B2 | 1/2007 | Ergun et al. |
| 7,181,369 B2 | 2/2007 | Kanki et al. |
| 7,187,987 B2 | 3/2007 | Andersen |
| 7,312,591 B2 | 12/2007 | Washeleski et al. |
| 7,449,856 B2 | 11/2008 | Valencia et al. |
| 7,737,860 B2 | 6/2010 | Banta et al. |
| 7,986,220 B2 | 7/2011 | Kiyomasa et al. |
| 8,040,217 B2 | 10/2011 | Fitzgibbon |
| 8,436,713 B2 | 5/2013 | Hormann |
| 8,842,829 B2 | 9/2014 | Bresson et al. |
| 8,866,583 B2 | 10/2014 | Ordaz |
| 8,994,496 B2 | 3/2015 | Freese et al. |
| 9,122,254 B2 | 9/2015 | Cate et al. |
| 9,141,099 B2 | 9/2015 | Cate et al. |
| 9,243,448 B2 | 1/2016 | Cui et al. |
| 9,376,851 B2 | 6/2016 | Cate et al. |
| 9,580,957 B2 | 2/2017 | Goodman et al. |
| 9,644,416 B2 | 5/2017 | Fitzgibbon et al. |
| 9,896,877 B2 | 2/2018 | Fitzgibbon et al. |
| 9,909,351 B1 | 3/2018 | Mcnabb |
| 10,081,977 B2 | 9/2018 | Shelley |
| 10,096,187 B2 | 10/2018 | Deneen et al. |
| 10,126,737 B2 | 11/2018 | Fitzgibbon |
| 10,138,671 B2 | 11/2018 | Fitzgibbon |
| 2002/0095269 A1 | 7/2002 | Natalini et al. |
| 2003/0033388 A1 | 2/2003 | Hom et al. |
| 2006/0255931 A1 | 11/2006 | Hartsfield et al. |
| 2009/0096622 A1 | 4/2009 | Banta et al. |
| 2014/0258497 A1 | 9/2014 | Kiyomasa et al. |
| 2014/0331557 A1 | 11/2014 | Bruns et al. |
| 2014/0339024 A1 | 11/2014 | Tyni et al. |
| 2017/0171607 A1* | 6/2017 | Britt ................... H04N 21/6125 |
| 2018/0013824 A1* | 1/2018 | Knopf ..................... H04L 9/321 |
| 2018/0114384 A1 | 4/2018 | Graziano |
| 2018/0213522 A1 | 7/2018 | Hall et al. |
| 2018/0248955 A1 | 8/2018 | Kinnari et al. |
| 2018/0253569 A1* | 9/2018 | Swierk ..................... G06F 21/86 |
| 2018/0330605 A1 | 11/2018 | Ikeler et al. |
| 2018/0347250 A1 | 12/2018 | Null et al. |
| 2018/0350149 A1* | 12/2018 | Dandekar ........... G06F 3/04847 |
| 2019/0230518 A1* | 7/2019 | Lotter ................... H04W 16/26 |
| 2020/0050753 A1* | 2/2020 | Davis .................. G06F 21/6218 |
| 2020/0059976 A1* | 2/2020 | Bhatia ................... H04W 8/005 |

OTHER PUBLICATIONS

Sato et al. "Determination of optimum criteria for condition-based maintenance of automatic ticket gates using remote monitoring data." Procedia CIRP 59 (2017): 190-195.

"Final Presentation": University of Connecticut; Archit Singh, Jing Yang, Gregory Bibisi; "Team 1812: Monitoring and Correctness of BPMN Based Workflows (Stanley Automatic Doors)." pp. 2-19. https://ecesd.engr.uconn.edu/ecesd1812/presentation-spring-2018/. May 4, 2018.

Search Report and Written Opinion received in corresponding PCT Application No. PCT/US2020/033552 dated Aug. 26, 2020, 14 pages.

* cited by examiner

SYSTEMS AND METHODS FOR DOOR AND DOCK EQUIPMENT SERVICING

RELATED APPLICATIONS

This patent application claims priority to the following identically-titled U.S. Patent Applications: U.S. Patent Application No. 62/984,032, filed Mar. 2, 2020; and U.S. Patent Application No. 62/854,455, filed May 30, 2019. The entire contents of each of the aforementioned provisional patent applications are hereby incorporated herein by reference.

FIELD OF THE INVENTION

The present disclosure generally relates to computer-implemented methods, systems comprising computer-readable media, and electronic devices for monitoring automatic mechanical devices and, more particularly, for monitoring automatic doors and/or automatic dock equipment located at one or more commercial sites and determining actionable device statuses based thereon.

BACKGROUND

Contemporary workflows for maintaining automatic mechanical devices at commercial sites predominantly start with a service technician visiting each device. The technician temporarily establishes electronic communication with the device and draws relevant data from which to diagnose a problem. The technician renders advice to the owner of the site regarding how best to address the problem.

Advances over the predominant workflow outlined above have been attempted. For example, U.S. Pat. No. 7,181,369 to Kanki et al. discloses "automatic door apparatuses [that] send[ ], to [an] administration center, operating information . . . with apparatus identification information attached thereto. The administration center is operative to classify the operating information of each door apparatus into a number of categories based on the apparatus identification information for storage, and to output the operating information in response to a call[ ]." However, Kanki and similar prior disclosures fail to provide a viable system for modern use.

This background discussion is intended to provide information related to the present invention which is not necessarily prior art.

BRIEF SUMMARY

Embodiments of the present technology relate to computer-implemented methods, systems comprising computer-readable media, and electronic devices for monitoring automatic mechanical devices. The embodiments may enable use of cross-functional and secure monitoring devices within a cloud-based, internet-of-things (IoT) environment servicing a plurality of application programming interface (API) specifications.

More particularly, in a first aspect, a method may be provided for monitoring a plurality of automatic mechanical devices located at a commercial site, the automatic mechanical devices being selected from at least one of automatic doors and automatic dock equipment. The method may include installing, at the commercial site, a plurality of internet-of-things (IoT) monitoring devices. Each of the IoT monitoring devices may include a plurality of connectors respectively corresponding to a plurality of data communication standards, and a wireless transceiver configured to transmit operational information corresponding to data received over the connectors. One of the connectors of each of the IoT monitoring devices may be joined to a corresponding one of the automatic mechanical devices to establish electronic communication therewith. Moreover, a plurality of device profiles may be assigned respectively to the automatic mechanical devices. Each of the device profiles generally corresponds to the respective joined connector and a combination of manufacturer and device model. At least a portion of the data from the automatic mechanical devices may be received over the joined connectors by the IoT monitoring devices, where the data reflect operational events and states of the respective automatic mechanical devices. The operational information of the automatic mechanical devices may be transmitted, via the wireless transceivers of the IoT monitoring devices, for analysis based at least in part on each corresponding device profile. The method may include additional, less, or alternate actions, including those discussed elsewhere herein.

In another aspect, a system may be provided for monitoring a plurality of automatic mechanical devices located across a plurality of commercial sites, the automatic mechanical devices being selected from at least one of automatic doors and automatic dock equipment. The system may include a plurality of internet-of-things (IoT) devices installed at respective ones of the plurality of commercial sites. Each IoT device may include a plurality of connectors respectively corresponding to a plurality of data communication standards, with one of the plurality of connectors being joined and in electronic communication with a respective one of automatic mechanical devices. Each IoT device may also include a wireless transceiver configured to transmit operational information corresponding to data received over each of the connectors. The system may also include at least one data processing server in electronic communication with the IoT devices, where the data processing server(s) comprise(s) a processing element and a non-transitory computer-readable medium storing program instructions that, when executed by the processing element, cause the at least one processing server to: receive the operational information corresponding to the automatic mechanical devices and transmitted according to the plurality of data communication standards; retrieve a device profile corresponding to each of the automatic mechanical devices, each of the device profiles corresponding to the respective joined connector and a combination of manufacturer and device model; analyze the operational information corresponding to the automatic mechanical devices at least in part based on the corresponding device profiles to determine a corresponding plurality of device statuses; transmit the device statuses, via at least one application programming interface (API), to respective ones of a plurality of computerized maintenance managements systems corresponding to the plurality of commercial sites. The system may include additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

As noted above, contemporary workflows for maintaining automatic mechanical devices at commercial sites predominantly start with a service technician visiting each device. The technician temporarily establishes electronic communication with the device and draws relevant data from which to diagnose a problem. The technician renders advice to the owner of the site regarding how best to address the problem.

U.S. Pat. No. 7,181,369 to Kanki et al. discloses "automatic door apparatuses [that] send[ ], to [an] administration center, operating information . . . with apparatus identification information attached thereto. The administration center is operative to classify the operating information of each door apparatus into a number of categories based on the apparatus identification information for storage, and to output the operating information in response to a call[ ]." However, Kanki and similar prior disclosures fail to provide a system including cross-functional and secure monitoring devices for use within a cloud-based, internet-of-things (IoT) environment servicing a plurality of application programming interface (API) specifications.

Exemplary System

Figure 1:
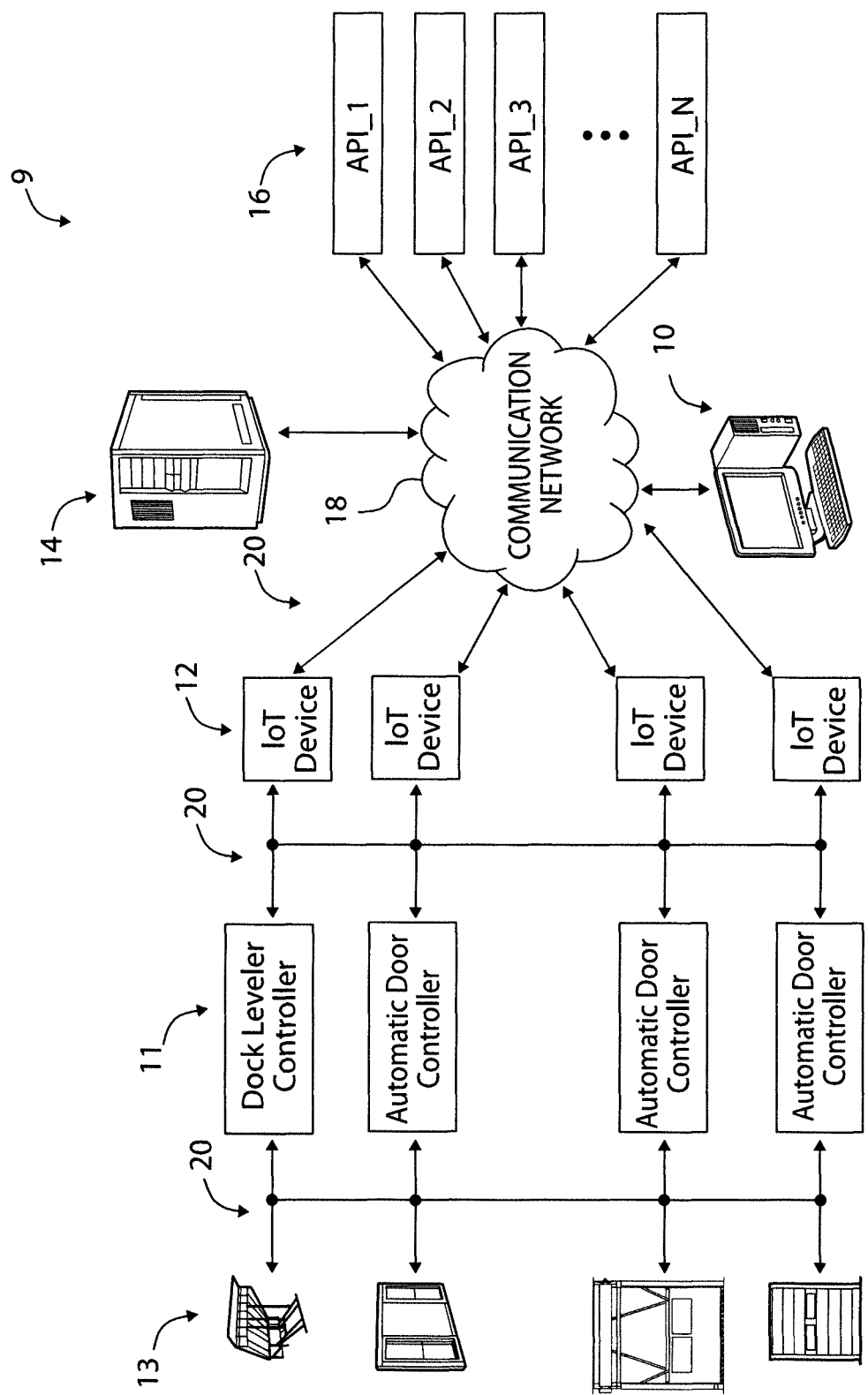
FIG. 1 illustrates various components, in block schematic form, of an exemplary system for monitoring automatic mechanical devices in accordance with embodiments of the present invention.

Improved monitoring systems and methods are provided according to embodiments of the present invention. Turning to FIG. 1, a modern cloud- and IoT-based computing environment 9 includes a customer or provider computing device 10 for use by technicians and/or other personnel, a plurality of controllers 11 (illustrated as a plurality of dock leveler controllers and door controllers), and a plurality of corresponding IoT monitoring devices 12.

The controllers 11 are typically integral with automatic mechanical devices 13 such as automatically-actuated automatic doors including high speed doors, rolling steel doors, sectional doors, sliding doors, swinging doors, revolving doors, upward-acting industrial doors, higher performance industrial doors, as well as automatically-actuated dock equipment including automatic dock levelers and trailer restraints, or the like. Exemplary automatic mechanical devices 13 may be manufactured by companies operating under, and/or may be sold under, any of the following service marks and trademarks as of the date of initial filing of the present disclosure: DYNACO®, KELLEY® or SERCO® (registered trademarks of Entrematic Group AB Corporation); RYTEC® (a registered trademark of Rytec Corporation); ALBANY® or BESAM® (registered trademarks of Assa Abloy Entrance Systems AB); POWERAMP®, DLM®, or MCGUIRE® (registered trademarks of Systems, LLC); STANLEY® (a registered trademark of Stanley Logistics, LLC); RECORD® (a registered trademark of Agta Record AG Corporation); HORTON® or OVERHEAD DOOR™ (trademarks of Overhead Door Corporation); CORNELL® or COOKSON® (registered trademarks of CIW Enterprises Corporation); and LIFTMASTER® (a registered trademark of Chamberlain Group, Inc.).

Technical specifications for the controllers 11 may vary across manufacturers and models, including with respect to input/output data communication standards, connector type(s), and data format(s) for electronic communication. The electronic communication may be between the controller 11 and other components of the automatic mechanical devices 13 and/or diagnostic or other external devices in communication with the controller 11.

For example, regarding connectors, a first automatic door 13 may have a controller 11 configured for communication with external devices via a registered jack "11" or "45" (RJ11/45) connection, and a second automatic door 13 may have a controller 11 configured for communication with external devices via a D-Subminiature (DB9) connection or an input/output (I/O) port. Moreover, regarding communications, a first automatic door 13 may have a controller 11 configured for communication via registered standard 232 (RS-232), and a second automatic door 13 may have a controller 11 configured for communication via CAN bus. As noted hereinabove, differences in connector and data communication standard types may be evident across different manufacturers and/or across different models of a given manufacturer.

Each IoT device 12 may be installed for electronic communication with one of the controllers 11 via one of a plurality of connector types available on the IoT device 12 (discussed in more detail below). Each IoT device 12 may additionally establish electronic communication with one or more input/output relays carrying sensing and/or control/command signals exchanged between a controller 11 and other components of the corresponding automatic mechanical device 13. The other components may include sensors, encoders, drivers, actuators/motors or the like. Moreover, each IoT device 12 may include additional or supplemental sensor(s) not made available by the manufacturer with the corresponding automatic mechanical device 13, such as supplemental environmental sensors for sensing temperature, humidity, barometric pressure, smoke or other gaseous products of chemical reaction, or the like.

The various data sources mined by the IoT devices 12 and outlined above generally reflect different levels of data refinement. Moreover, reaching the level of data refinement required for subsequent analyses (discussed in more detail below) generally requires varying levels of additional input for providing context and metadata regarding the source and meaning of the detected signals and their various sources.

In a preferred embodiment of the present invention, a cloud-based system is configured for cross-functional and secure collection, management, transmission and analysis of such data, and dissemination of the data and the results of such analyses across a variety of computerized maintenance management systems (CMMS) of a plurality of customers. For purposes of this disclosure, "CMMS" shall include building management software programs and applications, sometimes referred to elsewhere with the "BMS" acronym. Further, embodiments of the present invention permit swift and simple on-site configuration of each of the IoT devices 12 for conversion and refinement of data from multiple of the data sources, as discussed in more detail below.

As used herein, data "refinement" generally refers to substituting a set of raw data with a newly-formatted set of data better-suited for analysis and/or with a set of data that is output from at least one computation that uses the raw data as input and adds context or meaning to the raw data in preparation for analysis. For example, a digital input signal received by an IoT monitoring device over a connector from an automatic device may be "refined" by the IoT monitoring device by consulting a downloaded device profile to translate the input signal to a more general error code format for treating a variety of automatic devices and data communication standards. For another example, data may be refined by being enriched, at least in part through combination of data sets and/or substitution of two data sets with a new data set better prepared for subsequent analysis.

Further, as used herein, data "conversion" generally refers to changing analog signals to digital, or vice versa. For example, an analog voltage drop and/or sensor output signal may be "converted" to a digital signal by the IoT monitoring device by consulting the corresponding device profile to convert the signal to a digital signal format that is generally applicable for treating a variety of automatic devices and data communication standards.

The system 9 may also include at least one server 14 and a plurality of APIs 16 for communicating with the CMMSs of the plurality of customers. The at least one server 14 may be configured to receive—in batches, continuously and/or according to one or more event triggers—operational data and information from the IoT devices 12, at least some of which originates with or is derived from data obtained from the automatic mechanical devices 13.

The at least one server 14 may be configured for analysis of the operational data and information alone and in conjunction with historical device data relating to: corresponding ones of the automatic mechanical devices 13, to other automatic mechanical devices of the same manufacturer and model types, and/or to other automatic mechanical devices having one or more similarities to the corresponding ones of the automatic mechanical devices 13.

Moreover, the at least one server 14 may be configured to store and retrieve device profiles corresponding to each of the monitored automatic mechanical devices 13. The device profiles may contain information required for conversion, refinement and/or analysis of the operational data and information, as discussed in more detail below. It should be noted that, in a preferred embodiment, a portion of the data conversion and/or refinement may be performed by the IoT devices 12 prior to transmission to the at least one server 14.

Analysis of the operational data and information may result in an actionable conclusion regarding the status of one or more of the automatic mechanical devices 13 (i.e., an actionable device status, discussed in more detail below). The actionable conclusion may relate to a present or anticipated maintenance issue. The actionable conclusion may be of a type best addressed by customer personnel at a respective customer commercial site, by provider personnel, and/or by third party service provider(s). The at least one server 14 may be configured to communicate each actionable conclusion to a corresponding CMMS via one or more of the APIs 16, including in connection with automatic scheduling of service appointments, provision of instructions for implementation by customer personnel, provision of alerts and reports regarding future anticipated needs, or the like.

In one or more embodiments, several customers may utilize a single API 16 configured to communicate with similarly-specified CMMSs, whereas at least one other customer may utilize a second API 16 configured to communicate with a differently-specified CMMS.

Exemplary CMMSs that may exchange data with and or include one or more of the APIs 16 include those offered under any one of the following trademarks and service marks as of the date of initial filing of the present disclosure: SERVICE CHANNEL® (a registered trademark of ServiceChannel.com, Inc.), SAP™ (a trademark and service mark of SAP Aktiengesellschaft, Joint Stock Company), CORRIGO® (a registered trademark of Corrigo Incorporated), VERISAE® (a registered trademark of Verisae, Inc.), FEXA® (a registered trademark of Zamo Technologies, LLC), FMPILOT® (a registered trademark of FacilitySource, LLC), MAXIMO® (a registered trademark of International Business Machines Corporation), or the like.

The at least one server 14 may also be configured to store the operational data and information and results of any analysis, conversion and/or refinement operations in a database for future reference or use. It should also be noted that such data and information relating to each of the automatic mechanical devices 13 may also be routed by the IoT devices 12 and/or by the at least one server 14 directly to a respective computing device 10 (e.g., of the customer) and/or to the CMMS of the respective customer for storage and/or additional analysis or action.

One or more computing devices 10 may be accessed by personnel of the customer and/or of the provider for various setup, installation and/or administrative purposes. In one or more embodiments, a computing device 10 may be utilized by provider personnel to assist with installation and setup of the IoT devices 12 at one or more commercial sites. For example, the computing device 10 may be in electronic communication with each IoT device 12 to assist in the setup process at least in part by receiving selection of a device profile and locating and facilitating download of a corresponding software package for refinement and/or conversion of data received by the IoT device 12 from the corresponding automatic mechanical device 13. One of ordinary skill will appreciate that other setup tasks—such as facilitating the establishment of and/or configuring a WiFi connection between each IoT device 12 and a communication network of the commercial site—may be performed by the computing device 10 without departing from the spirit of the present invention. However, in one or more embodiments, the IoT devices 12 may be sufficiently provisioned and configured to complete all or a portion of such setup and installation procedures at the commercial site.

For another example, a computing device 10 may be utilized by customer personnel to access operational data and information and/or actionable conclusion information regarding the customer's automatic mechanical devices 13. In one or more embodiments, such information may be accessed via a dashboard or other user interface populated with such operational data and information and accessible via secure access procedures discussed in more detail below.

Returning to FIG. 1, the automatic mechanical devices 13 and IoT devices 12 may be co-located at a commercial site or located across two or more commercial sites. The automatic mechanical devices 13 and IoT devices 12 may be considered co-located at a commercial site if they are installed at premises that meet at least one of the following criteria (i) through (iii): (i) the premises share at least one non-residential utility service; (ii) the premises are owned and/or operated by parties that share at least one property boundary; and (iii) the facilities are within one (1) mile of one another, measured from their geographical center. At least one, two or all of the above may be true.

Moreover, customer CMMSs and/or databases, the automatic mechanical devices 13 and/or the IoT devices 12 may be connected to a customer internal network 20, which may comprise a trusted internal network or the like and may be hosted and/or housed at the commercial site of the customer. Alternatively or in addition, one or more of the computing devices 10 may access the corresponding CMMSs, the APIs 16 and/or databases corresponding to the customer automatic mechanical devices 13 under a common authentication management framework. (See FIG. 7)

The computing device(s) 10 may each comprise a workstation. The computing device(s) 10 may be operated by customer personnel for the purpose of receiving actionable results and/or other operational information from corresponding IoT devices 12 and/or the at least one server 14. The customer personnel may participate in configuring the information developed and/or received from provider systems via the computing device 10, as discussed in more detail below.

Each user of a computing device 10 may be required to complete an authentication process to query a corresponding CMMS and/or database storing information regarding the customer automatic mechanical devices 13, as discussed in more detail below. Moreover, all or some of the CMMSs, APIs 16 and/or customer database may be maintained and/or owned by the customer and/or may be maintained on the internal network 20 within the scope of the present invention.

Figure 3:
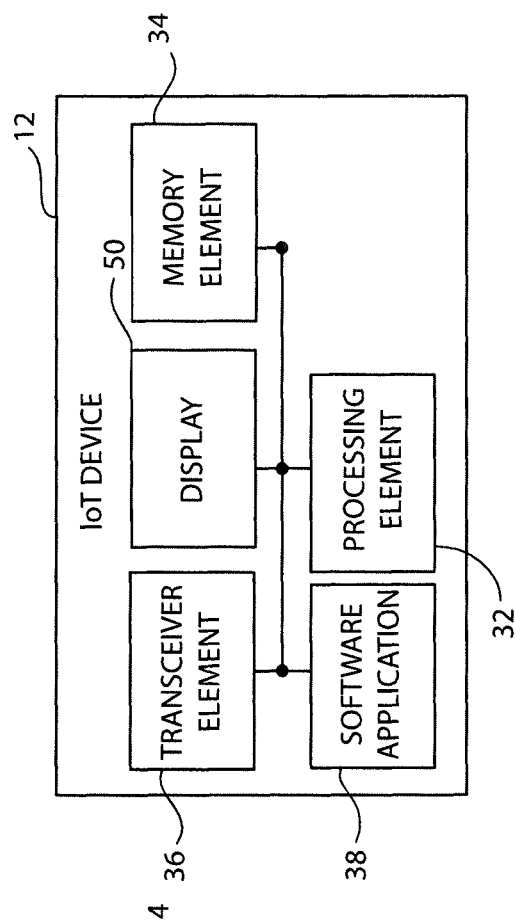
FIGS. 2, 3 and 4 illustrate various components of exemplary computing devices shown in block schematic form that may be used with the system of FIG. 1.
Figure 2:
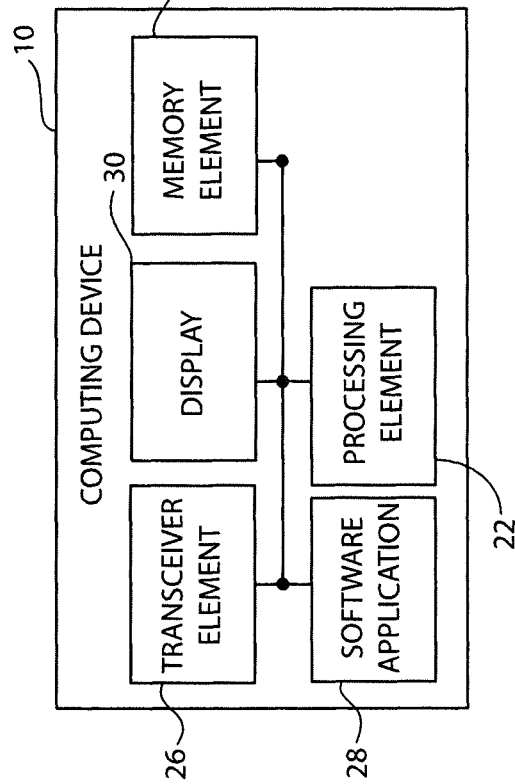
Figure 4:
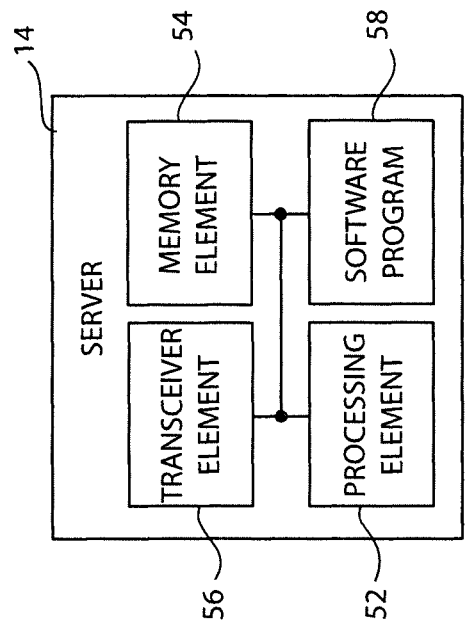

Turning to FIG. 2, generally the computing device(s) 10 may include tablet computers, laptop computers, desktop computers, workstation computers, smart phones, smart watches, and the like. Also referencing FIG. 3, each computing device and IoT device 10, 12 may respectively include a processing element 22, 32 and a memory element 24, 34. Each computing device and IoT device 10, 12 may also respectively include circuitry capable of wired and/or wireless communication with the internal network 20 and/or communication network 18, including, for example, transceiver elements 26, 36. Further, the computing device 10 and IoT devices 12 may respectively include a software application 28, 38 configured with instructions for performing and/or enabling performance of at least some of the steps set forth herein. In one or more embodiments, the software applications 28, 38 comprise programs stored on computer-readable media of memory elements 24, 34.

The computing device 10 and IoT devices 12 may also respectively include a display 30, 50. Each display 30, 50 may be characterized as plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. Each display 30, 50 may possess a square or a rectangular aspect ratio and may be viewed in either a landscape or a portrait mode. Preferably, each display 30, 50 includes touchscreen functionality permitting a user to interact by physically touching, swiping, or gesturing on areas of the screen.

The display 50 of each of the IoT devices 12 may also or alternatively be configured to periodically or continuously display indicators (e.g., a green light and a red light) indicating whether data collection and transmission to the at least one server 14 are being performed optimally or sub-optimally.

Generally, the at least one server 14 acts as a bridge between the IoT devices 12 and/or internal network 20 of the organization on the one hand, and the APIs 16 on the other hand. In one or more embodiments, the at least one server 14 also provide communication between the computing device 10 and IoT devices 12 and internal APIs 16, as discussed above. The at least one server 14 may include a plurality of proxy servers, web servers, cloud servers, communications servers, routers, load balancers, and/or firewall servers, as are commonly known.

The at least one server 14 also generally implement a data process service and/or decision engine (see FIGS. 7-8) for receiving and analyzing operational data and information from the IoT devices 12, generating actionable results, and transmitting all or some of the foregoing to APIs 16, customer CMMSs and/or databases belonging to the customer and/or the provider, and/or performing related functions. The at least one server 14 may retain and analyze electronic data and may respond to requests to retrieve data as well as to store data. In one or more embodiments, one or more provider databases may be maintained by one or more of the at least one server 14. Generally, the at least one server 14 may include a processing element 52, a memory element 54, a transceiver element 56, and a software program 58.

Each API 16 may include and/or provide access to one or more pages or sets of data and/or other content accessed through the World Wide Web (e.g., through the communication network 18) and/or through the internal network 20. Each API 16 may be hosted by or stored on a web server and/or database server, for example. The APIs 16 may include top-level domains such as ".com", ".org", ".gov", and so forth. The APIs 16 may be accessed using software such as a web browser, through execution of one or more script(s) for obtaining operational data and information and/or actionable results, and/or by other means for interacting with APIs without departing from the spirit of the present invention.

The communication network 18 generally allows communication between the at least one server 14 of the provider and APIs 16. The communication network 18 may also generally allow communication between the computing device 10 and/or IoT devices 12 and the at least one server 14, for example in conjunction with the common authentication framework discussed above and/or secure transmission protocol(s). The internal network 20 may generally allow communication between the controllers 11 and the IoT devices 12, between the IoT devices 12 and the communication network 18, and/or between the IoT devices 12 and the at least one server 14.

The communication networks 18, 20 may include the Internet, cellular communication networks, local area networks, metro area networks, wide area networks, cloud networks, plain old telephone service (POTS) networks, and the like, or combinations thereof. The communication networks 18, 20 may be wired, wireless, or combinations thereof and may include components such as modems, gateways, switches, routers, hubs, access points, repeaters, towers, and the like. The computing device 10 and IoT devices 12, at least one server 14 and/or APIs 16 may, for example, connect to the communication networks 18, 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof. Preferred configurations of the IoT devices 12 are discussed in more detail below.

The transceiver elements 26, 36, 56 generally allow communication between the computing device 10, the controllers 11, the IoT devices 12, the at least one server 14, the communication networks 18, 20 and/or the APIs 16. The transceiver elements 26, 36, 56 may include signal or data transmitting and receiving circuits, such as antennas, amplifiers, filters, mixers, oscillators, digital signal processors (DSPs), and the like. The transceiver elements 26, 36, 56 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the transceiver elements 26, 36, 56 may utilize communication standards such as ANT, ANT+, Bluetooth™ low energy (BLE), the industrial, scientific, and medical (ISM) band at 2.4 gigahertz (GHz), or the like. Alternatively, or in addition, the transceiver elements 26, 36, 56 may establish communication through connectors or couplers that receive metal conductor wires or cables, like Cat 6 or coax cable, which are compatible with networking technologies such as ethernet. In certain embodiments, the transceiver elements 26, 36, 56 may also couple with optical fiber cables. The transceiver elements 26, 36, 56 may respectively be in communication with the processing elements 22, 32, 52 and/or the memory elements 24, 34, 54. Preferred configurations of the IoT devices 12 are discussed in more detail below.

The memory elements 24, 34, 54 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 24, 34, 54 may be embedded in, or packaged in the same package as, the processing elements 22, 32, 52. The memory elements 24, 34, 54 may include, or may constitute, a "computer-readable medium." The memory elements 24, 34, 54 may store the instructions, code, code segments, software, firmware, programs, applications, apps, services, daemons, or the like that are executed by the processing elements 22, 32, 52. In one or more embodiments, the memory elements 24, 34, 54 respectively store the software applications/program 28, 38, 58. The memory elements 24, 34, 54 may also store settings, data, documents, sound files, photographs, movies, images, databases, and the like.

The processing elements 22, 32, 52 may include electronic hardware components such as processors. The processing elements 22, 32, 52 may include electronic hardware components such as digital processing units. The processing elements 22, 32, 52 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 32, 52 may generally execute, process, or run instructions, code, code segments, software, firmware, programs, applications, apps, processes, services, daemons, or the like. For instance, the processing elements 22, 32, 52 may respectively execute the software applications/program 28, 38, 58. The processing elements 22, 32, 52 may also include hardware components such as finite-state machines, sequential and combinational logic, and other electronic circuits that can perform the functions necessary for the operation of the current invention. The processing elements 22, 32, 52 may be in communication with the other electronic components through serial or parallel links that include universal busses, address busses, data busses, control lines, and the like.

Figure 5:
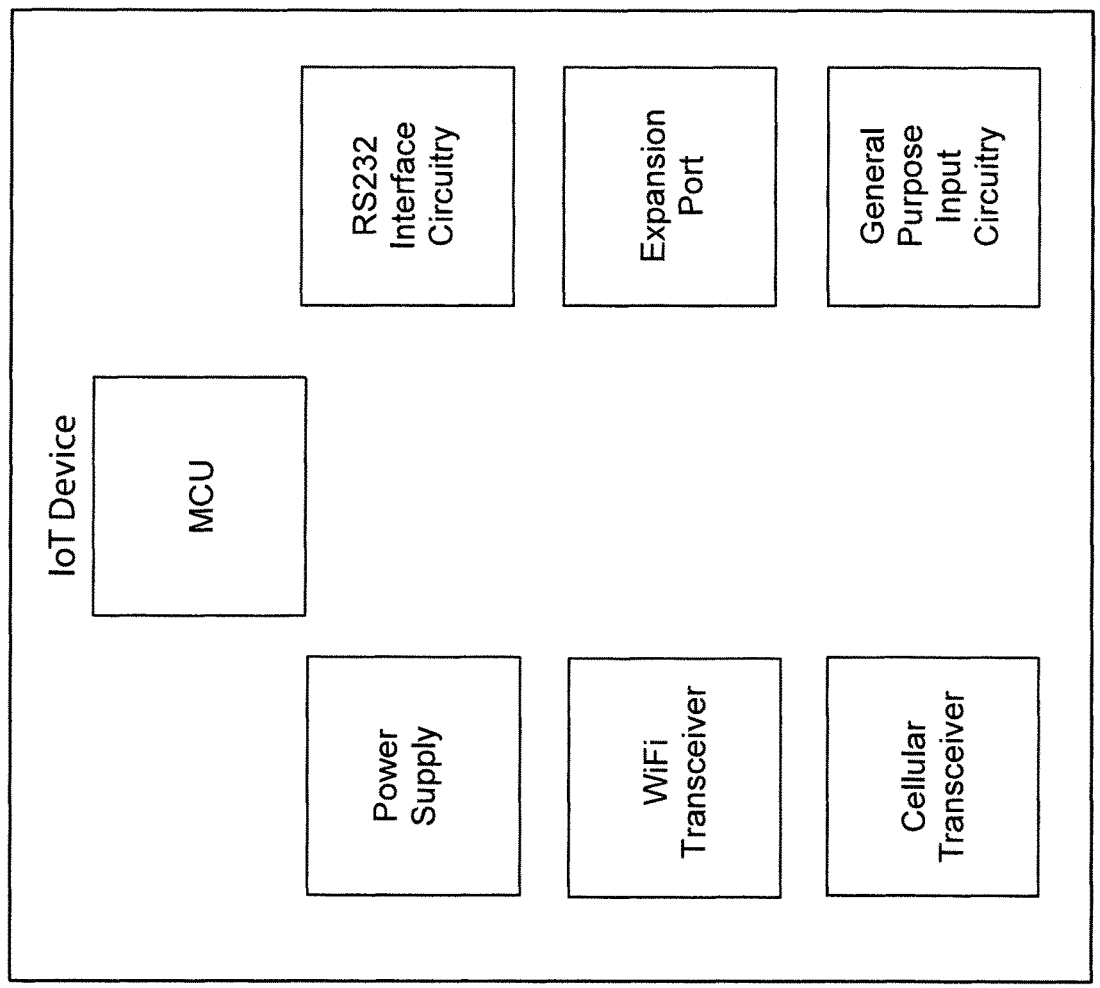
FIG. 5 illustrates various components of an exemplary IoT monitoring device shown in block schematic form that may be used with the system of FIG. 1.

Turning to a more particular embodiment of the IoT devices 12 illustrated in FIG. 5, processing element 32 may comprise a power supply circuit and a microcontroller unit (MCU). The power supply circuit may be configured for operation using one or both of alternating and direct currents, which may be received from onboard battery sources, from a controller of a corresponding automatic device, from a wall socket and/or the like. If power is supplied from the controller of the corresponding automatic device, the joined connector may, in an embodiment, carry the current. For example, in an embodiment, the power supply circuit converts incoming electrical energy to provide proper voltages to operate the rest of the IoT device 12. In one or more embodiments, the MCU may comprise a unit sold under the trademark ESP32™ (a trademark of Espressif Systems) as of the date of initial filing of the present disclosure. The MCU may be integral with one or more of WiFi and Bluetooth™ circuitry of the transceiver element 36.

Each transceiver element 36 may additionally include RS-232 interface circuitry, general purpose input circuitry, a cellular transceiver, a WiFi transceiver and/or an expansion port. The RS-232 interface circuitry may provide level shifting between the IoT device 12 and a respective controller 11, permitting RS-232 connectivity for monitoring and control. The general purpose input circuitry may permit monitoring of voltage levels of external wiring of the corresponding automatic mechanical device 13, such as where input/output relays carrying sensing and/or control/command signals exchanged between a controller 11 and other components of the corresponding automatic mechanical device 13 are monitored to determine the state of the automatic mechanical device 13. In an embodiment, the general purpose input circuitry is configured to monitor voltages between three (3) and twenty-four (24) volts direct current (VDC), and to provide three and three-tenths (3.3) VDC pullup. The expansion port may comprise a high speed serial peripheral interface (SPI) compatible port utilizing low-voltage differential signaling (LVDS) to communicate with external circuitry to allow, for example, additional special purpose circuitry (such as voltage and ampere monitoring) to be added to the automatic mechanical device 13. Moreover, the cellular transceiver may provide data connectivity to the Internet in the event that a particular location does not have WiFi suitable for use by the IoT device 12. All or some of the components of the IoT devices 12 outlined above may comprise a small printed circuit board assembly (PCBA). The cellular transceiver may be on a secondary printed circuit board assembly (PCBA).

Figure 6:
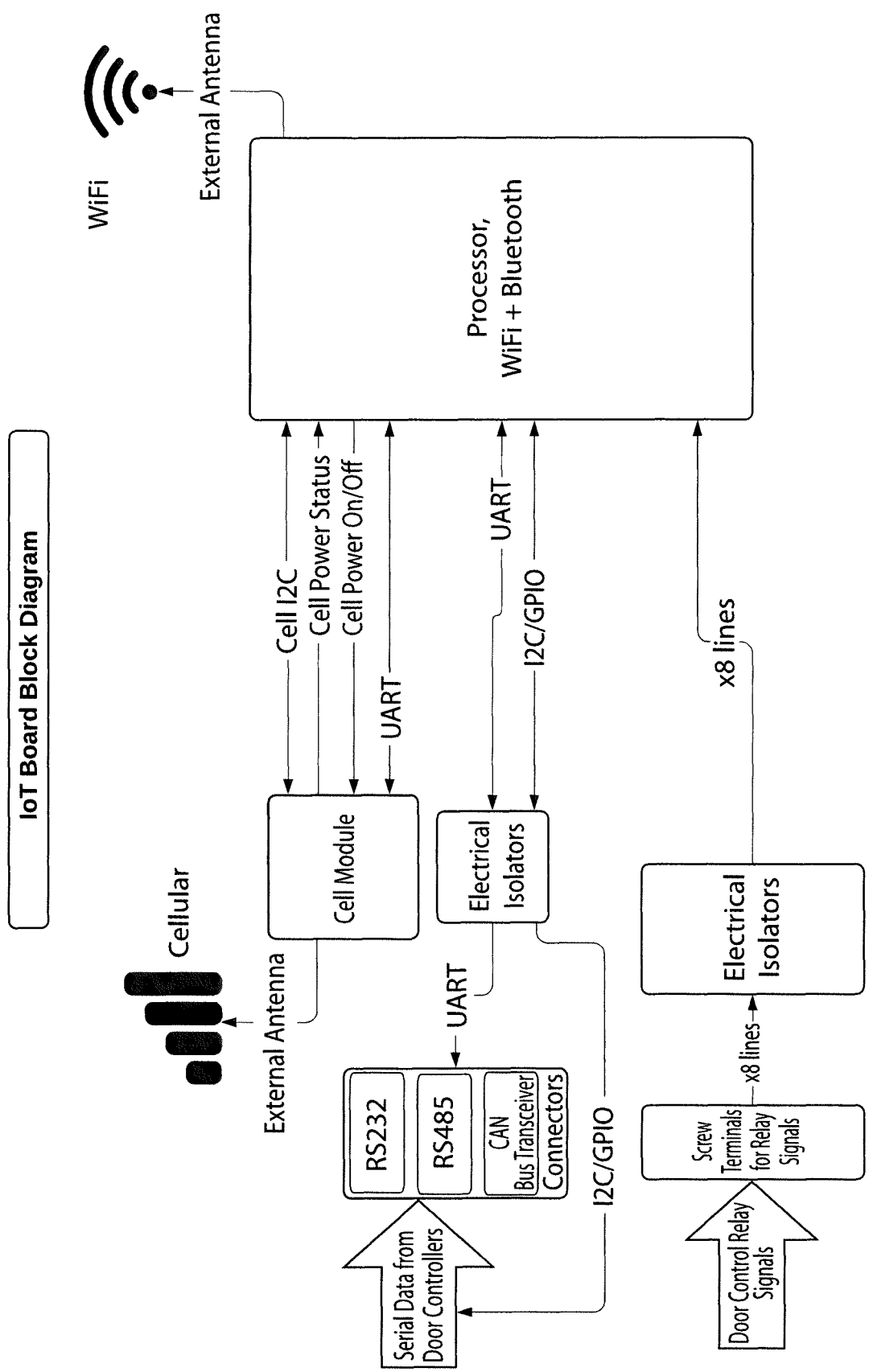
FIG. 6 is a flowchart of various logical and hardware components of the exemplary IoT monitoring device of FIG. 5, and of functions of and data flow therebetween, in accordance with embodiments of the present invention.

Turning to FIG. 6, the transceiver element 36 of the IoT devices 12 may include a plurality of connectors and corresponding data communication standards (e.g., RS-232, RS-422, RS-423, RS-485, MOD bus and/or CAN Bus) in electronic communication (e.g., via electrical isolators) with a processor of the processing element 32. Moreover, the transceiver element 36 may include a plurality of input/output (I/O) ports (illustrated as screw terminals) for electrical communication with input/output relays carrying sensing and/or control/command signals exchanged between a controller 11 and other components of the corresponding automatic mechanical device 13 and/or with supplemental sensors positioned adjacent the automatic mechanical device 13. The signals received at the I/O ports may be passed to the processor of the processing element 32 via electrical isolators. Moreover, the IoT devices 12 each include antennae and corresponding equipment and software known in the art for providing cellular and WiFi connectivity to one or both of the communication networks 18, 20.

Figure 7:
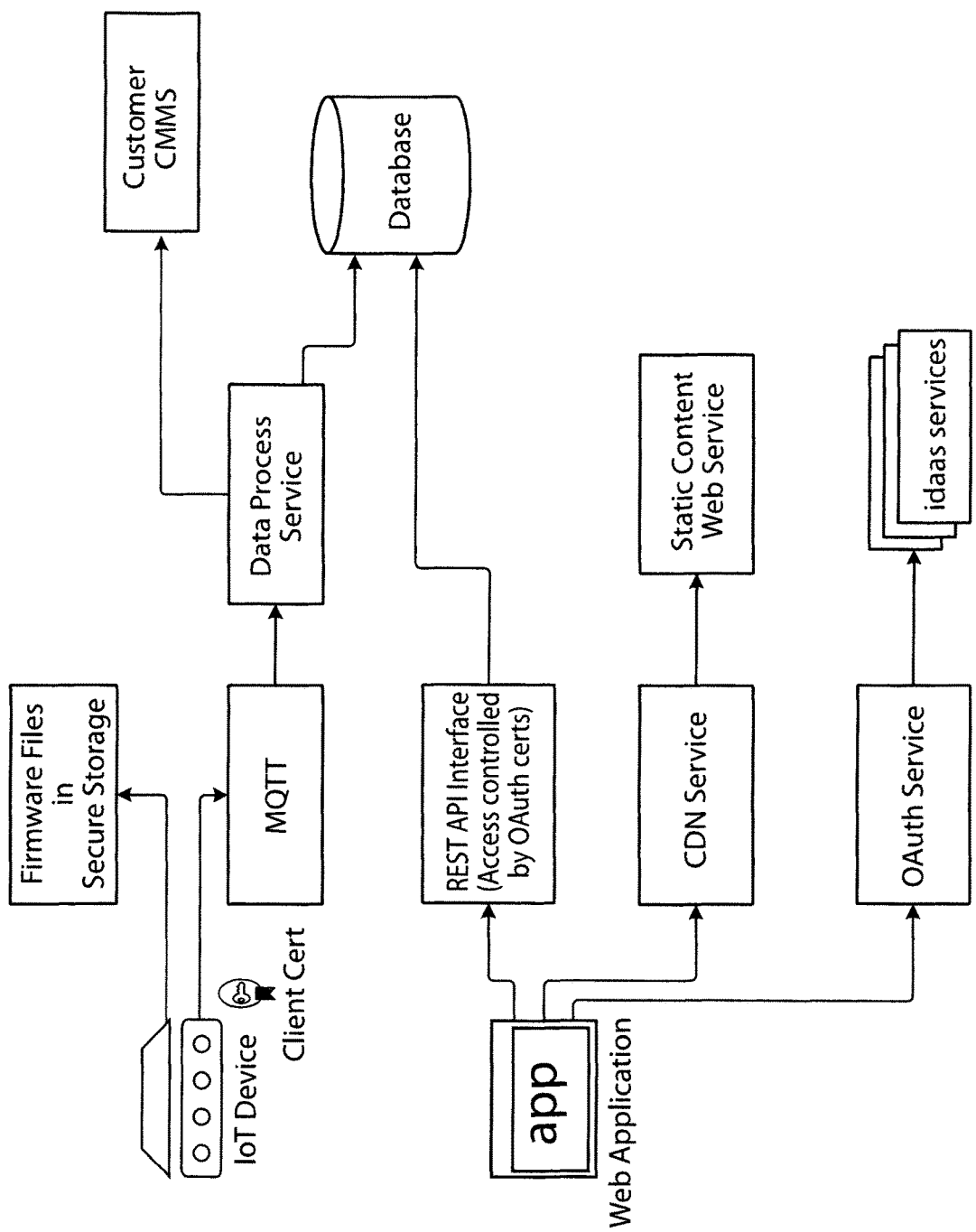
FIG. 7 is a flowchart of various components of exemplary infrastructure of participating provider and customer systems for monitoring automatic mechanical devices, and of data flows therebetween, in accordance with embodiments of the present invention.

Turning briefly to FIG. 7, an exemplary flowchart for secure communication of operational data and information and actionable results across the communication networks 18, 20 and between functional component blocks is illustrated. A Message Queuing Telemetry Transport ("MQTT") protocol is interposed in the flow of data and information between the IoT devices 12 and the at least one server 14. The MQTT protocol may be offered and/or operated under one or more of the following service marks as of the date of initial filing of the present disclosure: AZURE® (a registered service mark of Microsoft Corporation), AMAZON WEB SERVICES® (a registered service mark of Amazon Technologies, Inc.), or GOOGLE® (a registered service mark of Google, Inc.). The MQTT protocol may be implemented on a MQTT server of the at least one server 14, or by another MQTT server interposed in the chain of transmission between the IoT devices 12 and the at least one server 14. Implementation of the MQTT protocol for stateless flow of operational data and information between the IoT devices 12 and the at least one server 14 may be according to generally known principles, which may include use of a x509 certificate or form of certification for validation and/or identification of each IoT device 12.

The operational data and information may be encrypted while in transit between each IoT device 12 and the at least one server 14 by, for example, a Secure Sockets Layer (SSL) protocol or other known encryption methods. In one or more embodiments, the encryption may occur at each IoT device 12 prior to transmission via the communication networks 18, 20.

Further, access to the operational data and information transmitted by the IoT devices 12 and/or the actionable results generated by the at least one server 14—including via customer CMMS, customer database and/or computing device 10—may be controlled using security tokens or the like. In one or more embodiments, a web application executed by the computing device 10 may access a customer database via a representational state transfer (REST) API. The query from the web application may be accompanied by a security token. In connection with responding to the query, the security token may be validated by a computing device hosting the database and/or by an independent identification service within the scope of the present invention. In one or more embodiments, token generation and exchange as outlined above and/or in the Figures is in accordance with the OAuth 2.0 protocol as promulgated as of the date of initial filing of the present disclosure and/or with progeny of that protocol. One of ordinary skill will appreciate that a variety of authentication and/or validation protocols may be implemented for identification of the IoT devices 12, the at least one server 14 and/or computing devices 10 within the scope of the present invention.

In one or more embodiments, customer and/or provider databases storing operational data and information and/or actionable results relating to the automatic mechanical devices 13 may utilize a variety of formats and structures. For instance, relational databases and/or object-oriented databases may embody the databases. More particularly, the databases may embody and/or utilize Simple Object Access Protocol (SOAP), Remote Procedure Call (RPC), and/or Representational State Transfer (REST) types. One of ordinary skill will appreciate that—while examples presented herein may discuss specific types of databases—a wide variety may be used alone or in combination within the scope of the present invention.

Exemplary Method of Monitoring Automatic Mechanical Devices

Figure 8:
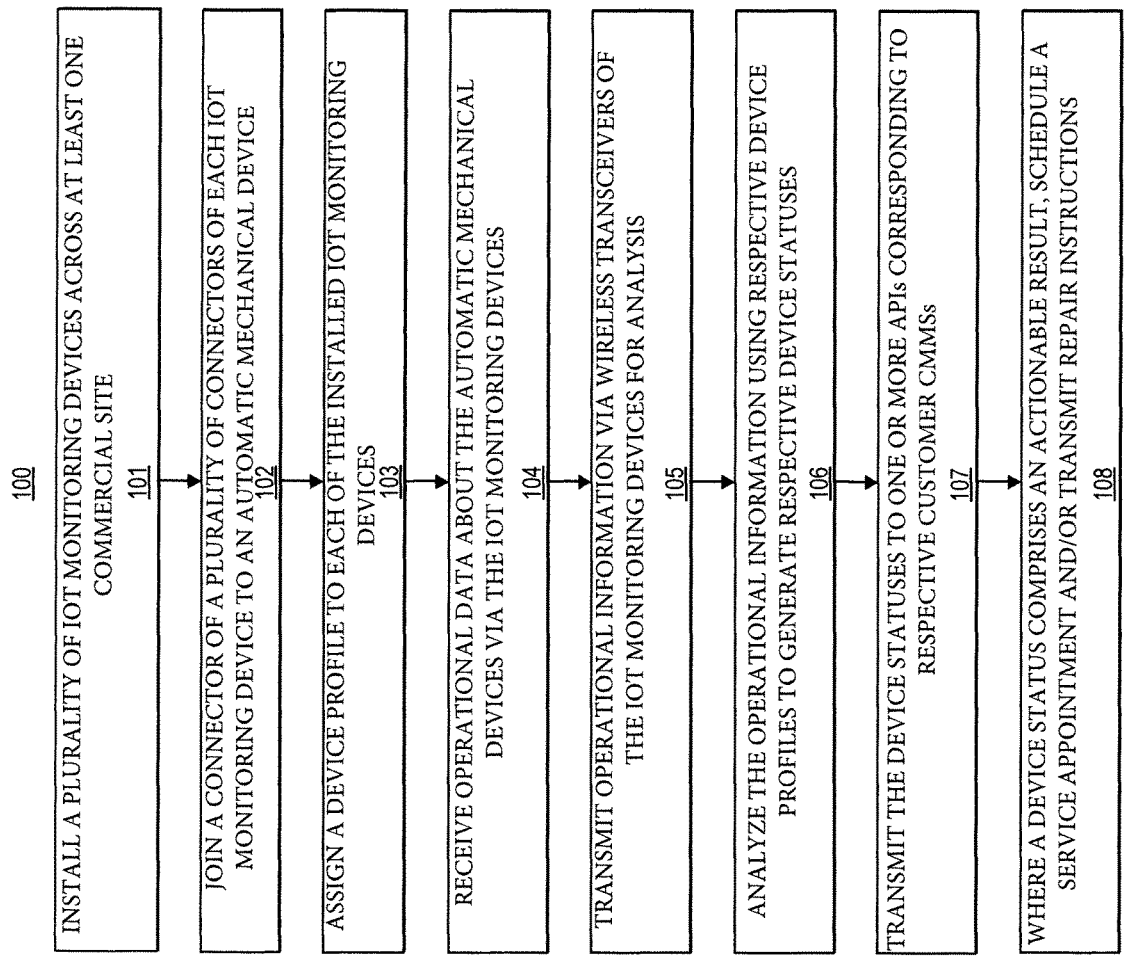
FIG. 8 is a flowchart illustrating at least a portion of the steps for monitoring automatic mechanical devices in accordance with embodiments of the present invention.

FIG. 8 depicts a flowchart including a listing of steps of an exemplary computer-implemented method 100 for monitoring automatic doors and/or automatic dock equipment located at one or more commercial sites and determining actionable device statuses based thereon. The steps may be performed in the order shown in FIG. 8, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1-7 and 9-10. For example, the steps of the computer-implemented method 100 may be performed by the computing device(s) 10, the controllers 11, the IoT devices 12, the at least one server 14, the APIs 16, and/or the networks 18, 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a plurality of IoT monitoring devices may be installed across one or more commercial sites. Each of the IoT monitoring devices may include a transceiver element, a display, a memory element and a processing element. The transceiver element may include a wireless transceiver and a plurality of wired connectors corresponding to a plurality of data communication standards.

In one or more embodiments, IoT monitoring devices are respectively installed in connection with two automatic doors and a dock leveling device at each of two separate commercial sites. Each set of two automatic doors comprises a first door having a first controller, and a second door having a second controller. The first and second controllers are originally sold by two separate manufacturers with the respective automatic door units, may be housed in headers or control boxes of the automatic doors, and are hard-wired for electronic communication with other customary automatic door components, including a sensor (e.g., for sensing motion) and an electric motor or actuator for extending and retracting the door along a track.

The first and second controllers may be configured for communication with external devices using different connector types, such as where the first controller is only pre-configured for such communications via an RJ45 connection, and the second controller is only pre-configured for such communications via a DB9 connection. Moreover, the first controller may only be pre-configured to communicate over the RJ45-type port using RS-232 data communication standard, and the second controller may only be pre-configured to communicate over the DB9-type port using a different data communication standard. One of ordinary skill will appreciate that any combination of a wide variety of connector types and data communication standards is within the scope of the present invention.

Similarly, each automatic dock leveling device at the two commercial sites may comprise a third controller. The third controller is originally sold by a third manufacturer with each of the automatic dock leveling devices, may be housed in a header or control box of the automatic dock leveling device, and is hard-wired for electronic communication with customary automatic dock leveling device components, including a sensor (e.g., an overhead door photo electric sensor) and an electric motor or actuator (e.g., a blower motor/compressor for actuating hydraulic components) for extending and retracting the platform.

The third controller may be configured for communication with external devices using, for example an RJ-45 type connector. Moreover, the third controller may only be pre-configured to communicate over the RJ-45 type connector using the CAN bus standard.

Each of the controllers may communicate with respective sensors, actuators (e.g., motors) and other automatic device components via wired connection. In one or more embodiments, all or a part of each of these wired connections and circuits may comprise input/output relays for carrying sensing and/or control/command signals exchanged between the controller and other components of the corresponding automatic mechanical device.

Each IoT monitoring device may be installed, at least in part, by an installation technician by affixing housing or another structural aspect of the device to the frame, controller box, header or another structural aspect of the corresponding automatic device to be monitored. The IoT monitoring device may be secured to the automatic device using screws or other fasteners.

Referring to step 102, a connector of each IoT monitoring device may be joined to a port or mating connector of the corresponding automatic device. This may include the installation technician selecting an appropriate one of the plurality of connectors of the IoT monitoring device, based on the layout and capabilities of the corresponding automatic device controller, and inserting the selected connector plug into or otherwise joining the selected connector plug with a corresponding port or plug of the corresponding automatic device to establish electronic communication therebetween.

In one or more embodiments, installation may also include establishing wired electronic connections for door control relay circuits of the automatic device at I/O ports of the corresponding IoT monitoring device. For instance, eight (8) I/O ports may be provided on each of the IoT monitoring devices, though one of ordinary skill will appreciate that the number provided may vary within the scope of the present invention.

In one or more embodiments, installation may also include attaching additional or supplemental sensor(s) not made available by the manufacturer with the corresponding automatic device, such as supplemental environmental sensors for sensing temperature, humidity, barometric pressure, smoke or other gaseous products of chemical reaction, or the like. The supplemental sensor(s) may be attached to the automatic device and/or surrounding structure using screws or other fasteners. Electronic communication between the supplemental sensor(s) and the corresponding IoT monitoring device may be established at one or more of the I/O port(s) of each corresponding IoT monitoring device and/or using free connector(s) of the IoT monitoring device.

Referring to step 103, a device profile may be assigned to each of the installed IoT monitoring devices. In one or more embodiments, each device profile comprises a collection of data, firmware and/or other software for configuring the IoT monitoring device to manipulate or transform one or more electrical signals received over the corresponding joined connector and/or electrically connected I/O port(s). For example, the device profile may be customized for one or more particularized aspects of the corresponding automatic device to which the IoT monitoring device is assigned. The device profile may include information enabling, for instance, data analysis, conversion and/or refinement operations to be carried out by the IoT monitoring device and/or at least one remote server in connection with collection and dissemination of operational data and information about the automatic device.

In one or more embodiments, each device profile may define data communication standard(s) and one or more properties or pattern(s) of electrical signals normally emitted by the corresponding automatic device. For example, the device profile may define one or more rules for converting analog signals of supplemental sensor(s) into more suitable formats and/or converting signals of relay circuits of the corresponding automatic device for storage and/or transmission to the at least one remote server discussed in more detail below.

At least one of aspect of the device profile may be selectable or configurable by the installation technician at the commercial site during the installation and setup processes. In one or more embodiments, the IoT monitoring device includes a touchscreen display and/or other aspects of a user interface necessary to make such selections and provide other input required to configure the device profile. Also or alternatively, the IoT monitoring device may be configured during setup with a master computing device of the installation technician, such as where electronic communication therebetween is established with one of the unused connectors of the IoT monitoring device and/or over Bluetooth™ or other wireless communication elements. In one or more embodiments, the master computing device may comprise a smart phone of the technician executing an installation application or smart phone "app" configured to perform installation and configuration steps outlined herein.

In one or more embodiments, the installation technician may select at least one of the following via the user interface of the IoT monitoring device and/or the master computing device of the installation technician: a manufacturer of the automatic device in electronic communication with the IoT monitoring device; a model of the automatic device; and a definition for each electrical circuit (e.g., relay circuit or supplemental sensor input) with which an I/O port is in electrical communication.

In a preferred embodiment, selection of the manufacturer and model of the automatic device will be from a pre-populated list. The selected device profile will also preferably include at least one pre-populated data field for the selected automatic device. For example, the device profile may be pre-populated to define the connector type, data communication standard, relay circuit signal format, and other aspects of the equipment and operation of the corresponding automatic device.

In one or more embodiments, the installation technician may select from a plurality of options for relay circuits and/or supplemental sensors and assign each to an I/O port of the IoT monitoring device. The installation technician may also input additional detail regarding the layout of each particular installation, with respect to each of the connector(s) and I/O ports in use according to the installation, so that the device profile may be customized to the extent necessary to support proper analysis, conversion and/or refinement of data received from the automatic device. For example, "Encoder Relay" may be selected from a pre-populated list and assigned to I/O port "1," and the installation technician may further note in the device profile that other aspects of the wiring of the "Encoder Relay" may cause lower-than-expected voltage draw during operation. Other physical or operational aspects of the IoT monitoring device and/or corresponding automatic device may be selected or otherwise input regarding the selected connections to further such analysis, conversion and/or refinement.

In one or more embodiments, all or part of the device profile may be downloaded to the IoT monitoring device from the technician's master computing device and/or from the at least one remote server. For example, all or part of the device profile may be downloaded during the installation and setup process on the commercial site, before, after and/or during customization by the installation technician. In this manner, cross-functional IoT monitoring devices may be easily placed, electronically connected to the corresponding automatic device, and configured for proper communication with a variety of different automatic devices across one or more commercial sites.

One of ordinary skill will appreciate, however, that all or some of the aforementioned selection, customization and/or download steps may be performed remotely prior to installation and/or following installation without departing from the spirit of the present invention. One of ordinary skill will also appreciate that the IoT monitoring devices may also or alternatively download firmware and other software updates automatically periodically and/or in response to trigger events (such as boot up and/or reboot events).

Referring to step 104, operational data may be received at the IoT monitoring devices from the corresponding automatic devices. The operational data may be received in batches, periodically, continuously and/or as triggered by one or more events (e.g., where occurrence of all or some operations performed by the automatic device triggers data transmission to the IoT monitoring device). The operational data may be raw data and signals in serial, chronological and/or timestamped format, and may comprise event data (e.g., reflecting open/close events, lift/lower events, sensor output, error codes or the like) and/or may reflect sensor output and/or electrical signals detected in relay circuits by the IoT monitoring devices.

Each IoT monitoring device may convert and/or refine the raw data received from a corresponding automatic device. In one or more embodiments, such conversion and/or refinement may be based at least in part on the rules and/or program instructions set forth in the device profile and/or pre-configured firmware or software stored at the IoT monitoring device. One of ordinary skill will appreciate that all or some of such conversion and/or refinement operations may be performed remotely without departing from the spirit of the present invention.

Referring to step 105, operational information based on and/or comprising the operational data may be transmitted via the wireless transceivers of the IoT monitoring devices for analysis. In one or more embodiments, the transmission will occur via WiFi and/or cellular transceivers. The operational information may comprise raw data and/or data produced by the conversion and/or refinement of the raw data by each IoT monitoring device. The operational information and/or operational data may include, for example and without limitation: door status (open/closed/in motion), voltage draw, safety device status (on/off), door opening and/or closing speed(s), door cycle count (number of completed open and closed cycles), maintenance data, status codes, error or fault codes or the like.

In one or more embodiments, the processing element of each IoT monitoring device may encrypt the operational information prior to transmission. For example, Advanced Encryption Standard (AES), Secure Hash Algorithm 2 (SHA-2), Rivest-Shamir-Adleman (RSA), Elliptic-curve cryptography (ECC), and/or random number generation (RNG) cryptography may be implemented by an MCU of the IoT monitoring device to carry out the encryption. Moreover, in one or more embodiments, the memory element of the IoT monitoring device may store the operational information. Storage of operational information may be maintained up to a data storage limit of the memory element, which may further or alternatively be limited by age of the stored data.

Referring to step 106, the operational information may be analyzed, based at least in part on corresponding device profiles, to generate respective device statuses. In one or more embodiments, the analysis is performed by at least one remote server. For example, the at least one remote server may comprise a cloud server or cloud computing network. As noted above, in one or more embodiments, an MQTT protocol may be interposed in the flow of data and information between the IoT monitoring devices and the at least one server. The MQTT protocol may be offered and/or hosted by the provider of cloud hosting services corresponding to the cloud computing network.

In a simple embodiment, analysis of the operational information to generate a device status may merely consist of determining that the operational information includes the device status already, such as where the controller of the corresponding automatic device passed an existing error code to the assigned IoT monitoring device, and the error code was passed through to the at least one remote server as part of the operational information.

However, in one or more embodiments, analysis of the operational information may be according to one or more other algorithms or rules configured to determine one or more device statuses. For example, the algorithms and/or rules may optionally be implemented in conjunction with and/or through execution of a machine learning program. The machine learning program may include curve fitting, regression model builders, convolutional or deep learning neural networks, Bayesian machine learning techniques, or the like. The machine learning program may identify patterns in data sets to help generate the one or more device statuses. The machine learning program may be trained using supervised and/or unsupervised machine learning processes without departing from the spirit of the present invention.

The one or more device statuses may reflect normal operation, abnormal operation, and/or present, predicted and/or anticipated needs for maintenance or other action at the commercial site with respect to each of the automatic devices. Rules for generating device statuses may be configured, and algorithms for generating device statuses may be trained, using past operational data of one or more of the following: the past operational data of the automatic device in question; past operational data of automatic devices with the same manufacturer and model as the automatic device in question; past operational data of automatic devices with the same manufacturer and a similar model to the automatic device in question; past operational data of automatic devices with the same manufacturer as the automatic device in question; past operational data of automatic devices with a similar model to the automatic device in question; and/or past operational data of automatic devices with one or more other similarities to the automatic device in question. One of ordinary skill will appreciate that all or some of the analysis of the operational information outlined herein may be performed by respective ones of the IoT monitoring devices without departing from the spirit of the present invention.

In one or more embodiments, the rules and/or algorithms developed to analyze the operational information will receive as input the operational information from one of the IoT monitoring devices and will generate a device status for the corresponding one of the automatic devices. In one or more embodiments, the rules and/or algorithms will also receive as input operational information from one or more of the other IoT monitoring devices of the same commercial site to generate a device status for the automatic device. Further, in one or more embodiments, the at least one remote server will retrieve past operational data of the automatic device and/or the one or more other IoT monitoring devices for use as input to the rules and/or algorithms in generating a device status for the automatic device. One of ordinary skill will appreciate from the above that a rule and/or algorithm may be developed and/or trained for use with one IoT monitoring device, with a sub-group of IoT monitoring devices, with all IoT monitoring devices of a customer, and/or with all or some of the foregoing groupings across a plurality of customers, without departing from the spirit of the present invention.

For example, historical and recent operational information regarding an automatic device under analysis may be sufficient to generate a device status for the automatic device in many cases. However, in one or more embodiments, the present or anticipated future status of the automatic device may depend on and/or may be informed by historical and recent operational information and/or device status(es) of one or more other automatic devices at the same commercial site. In one or more embodiments, automatic devices cooperating physically and/or that perform operationally linked functions at a commercial site may be better assessed together with respect to present and/or future anticipated statuses. For instance, pairs of inner and outer automatic doors—often implemented for climate control and energy efficiency—may be operationally linked and/or their operational statuses may be mutually relevant when assessing present or anticipated future status. Further, in one or more embodiments, two or more automatic doors and/or units of automatic dock equipment that perform substantially the same functions at the same commercial site may be operationally independent, but may be expected to encounter physically-related events or phenomena.

More particularly, such two or more automatic doors and/or units of automatic dock equipment may exhibit one or more of the following shared characteristics at a commercial site: location proximate one another; location in one or more areas assigned by the customer for the same or similar types and/or volumes of workload; location in one or more areas assigned by the customer for use with the same or similar client(s) and/or products/goods; location in one or more areas expected to be worked and/or overseen by the same or similar personnel; location in one or more areas subjected to the same or similar physical and/or environmental conditions, and the like.

All or some of the aforementioned input to the rules and/or algorithms may be included and/or embodied within the device profile for the automatic device. The device profile may include selections made by the installation technician setting out details of the installation and setup for the IoT monitoring device, as well as details about the automatic device that were either pre-populated and/or were input by the installation technician.

For example, the device profile may identify serial data received via I/O port "3" of the IoT monitoring device as corresponding to an environmental sensor output of a supplemental humidity sensor installed with the IoT monitoring device. The device profile may further identify data received via I/O port "2" of the IoT monitoring device as corresponding to voltage drop across a controller circuit that reflects actual opening/closing of a door or extension/retraction of a dock leveler. These data of the device profile may be input by the installation technician in connection with installation and setup at the commercial site.

The device profile may still further identify the manufacturer and model of the automatic device in question, along with details regarding the hardware and software utilized by the automatic device. Such information may provide context to operational data, such as where a particular voltage draw represents normal operation in a first model of a manufacturer, but indicates abnormal operation for a second model of the manufacturer. Other hardware details—such as relating to expected longevity of wear parts or the automatic device more generally—may be included in the device profile and provided as input to the rules and/or algorithms used to determine and/or generate device statuses.

Yet still further, the device profile may define relationships between the automatic devices observed or created during installation and setup processes (and selected or otherwise input by the installation technician during installation and setup) for use in analyses outlined above. For instance, the installation technician may indicate observed or anticipated relationships between automatic devices at the commercial site, such as by selecting two automatic devices that are operationally linked and/or that are expected to encounter physically-related events or phenomena, in support of interrelated analyses outlined above. One or more of these aspects of the automatic device and/or the IoT monitoring device embodied in the device profile may be input into and/or used to prepare input into the rules and/or algorithms that generate the device status.

The device profile may yet still further include information regarding customer personnel expected to oversee and/or work with or in proximity to the corresponding automatic device. This information may be used, alone or in connection with other information such as environmental sensor data and certain automatic device characteristics (e.g., manufacturer, series/model) to determine a device status corresponding to an asset useful life determination. For example, a rule and/or algorithm for determining asset useful life may be configured and/or trained based on historical data that includes consideration of the manufacturer and series/model, the environment in which the automatic device operates, and/or the relevant customer personnel (i.e., characteristics of such customer personnel and/or observed/historical characteristics—such as percentage of normal operation and/or longevity—of automatic devices associated with operation by such customer personnel). The calculation of asset useful life predictions may be by weighted summation or other form of calculation without departing from the scope of the present invention.

The at least one server may also calculate a running or rolling calculation for an ongoing maintenance cost for each of the automatic devices, which may be calculated continuously, periodically and/or upon the occurrent of one or more event triggers (e.g., upon access of each device profile and/or of operational information relating to the automatic device by customer personnel).

The device status may reflect the present physical position or orientation of the automatic device and/or present or anticipated functional health of one or more components of the automatic device. For example, the device status may comprise "Open," "Closed," "Extended" or "Retracted," along with indications of degree where applicable. For another example, the device status may include indications that maintenance is needed or will soon be needed. For still another example, the device status may reflect the present or anticipated malfunction of one or more components of the automatic device.

In one or more embodiments, inputs from the joined connector or one of the I/O port(s) of an IoT monitoring device will inform generation of a device status. For example, where "Open" data was received from the connector of the IoT monitoring device at a time zero (t0) and a pre-determined amount of time (e.g., reflecting normal door operation boundaries for a door specified in the corresponding device profile) has passed without receiving corresponding "Closed" data, an "Error" device status may be generated. Alternatively, if an error is not apparent under the circumstances outlined in this example, a "Prolonged Opening" device status may be generated to notify the customer that climate control costs may be exacerbated by the detected usage patterns of the monitored door.

In another embodiment, inputs from the joined connector and at least one of the I/O ports of an IoT monitoring device will cooperatively inform generation of a device status. For example, where "Open" data was received from the joined connector of the IoT monitoring device at a time zero (t0) and a pre-determined acceptable amount of time (e.g., reflecting normal door operation boundaries for a door specified in the corresponding device profile) has not yet passed, but where voltage drop data received via one of the I/O ports reflects an anomaly in the control circuit(s) of the automatic device, an "Error" device status may be generated. In another example, errors in operation of one or more of the control circuits of an automatic device may be detected by comparison of data from two or more of these inputs. For instance, data from a connector of the IoT monitoring device may reflect issuance of a command to "Open" the automatic (door) device, whereas voltage drop data received via one of the I/O ports may reflect that no such command was actually issued and/or that the command did not result in actuation of the door to an open position, indicating a control and/or controller error.

In still another embodiment, data from two or more IoT monitoring devices will cooperatively inform generation of a device status. For example, frequent opening of an outer door of a pair of inner and outer doors, where the inner door opens significantly less frequently during normal business hours, may support generation of an "Error" device status. For another example, a rule and/or algorithm may reach an inconclusive state in analysis for a first automatic device based on operational information from the assigned IoT monitoring device. However, information regarding a second automatic device logically linked to the first automatic device by the installation technician during installation and setup may resolve the inconclusive state to a device status. In an embodiment, data from the second automatic device may indicate likely exposure of both of the automatic devices to a physical phenomenon (e.g., an environmental condition, such as humidity, temperature, pressure, ambient light levels, or the like) that explains the operational information from the first automatic device and supports resolution to the device status.

Moreover, the rules and/or algorithms may predict errors and/or the need for maintenance based at least in part on data from the joined connector and two or more of the I/O ports of an IoT monitoring device. For example, timestamped data reflecting a delay between issuance of an operational command (e.g., "Open") and a voltage drop across a relay circuit—respectively collected via the joined connector and one of the I/O ports of the IoT monitoring device—may evince lengthening of the delay over time. Such correlation and/or underlying data may be input, together with input received from a humidity or other environmental sensor via another of the I/O ports of the IoT monitoring device, into a rule and/or algorithm configured and/or trained on data from similar manufacturer/model devices. The rule and/or algorithm may generate a prediction that the environment is degrading performance of the automatic device at a given rate (in view of the detected environmental condition) and such performance is expected to fall to unacceptable levels within a given projected timeframe.

In this manner, cross-functional IoT monitoring devices may be easily placed, electronically connected to the corresponding automatic device, and configured for detecting and predicting various error states across a plurality of different automatic devices across one or more commercial sites.

The at least one remote server may additionally categorize device statuses for each of the automatic devices as requiring customer action and/or provider action. Further, the at least one server may flag each device status and/or corresponding recommended action for transmission to a corresponding customer CMMS, for example where all device statuses are not regularly conveyed to the CMMS. Still further, the at least one remote server may store the device statuses and/or underlying operational information in a database for future access. Yet still further, the at least one remote server may, based on automated analysis of each corresponding device profile and linked pre-configured instructional materials, gather corresponding instruction materials wherever customer action is recommended. For example, the device profile for the corresponding automatic device may contain and/or include references to instructional materials (e.g., instructional videos and/or written materials) necessary for generating and/or inclusion in a recommended action plan for transmission to the customer in response to a device status.

Figure 9:
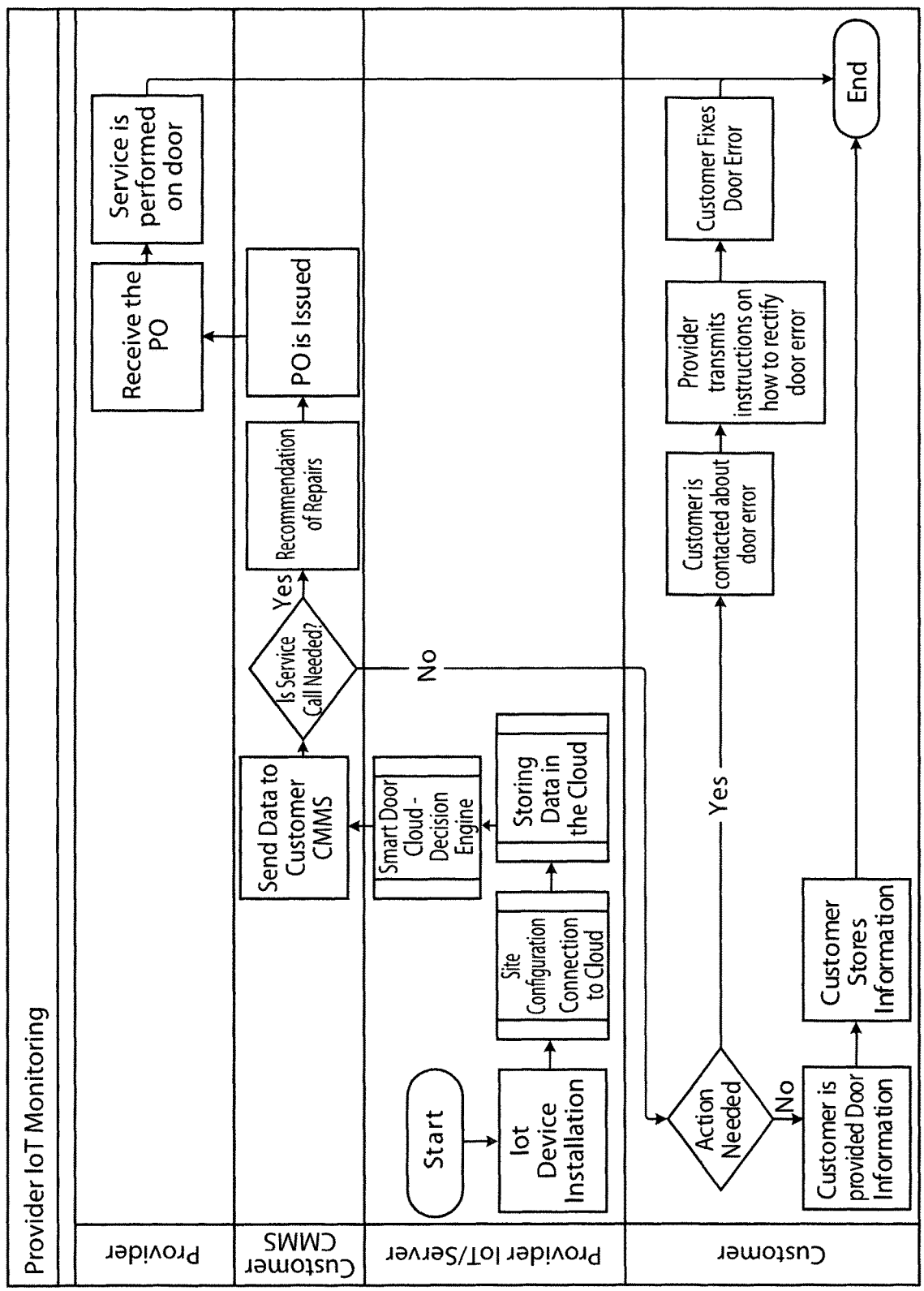
FIG. 9 is a flowchart of various components of exemplary infrastructure of participating provider and customer systems for monitoring automatic mechanical devices, and of steps performed by or in connection with the exemplary systems, in accordance with embodiments of the present invention.

Turning briefly to FIG. 9, it should be noted that, in preferred embodiments, the steps above taken by the IoT monitoring device and at least one remote server preferably form part of a provider system.

Figure 10:
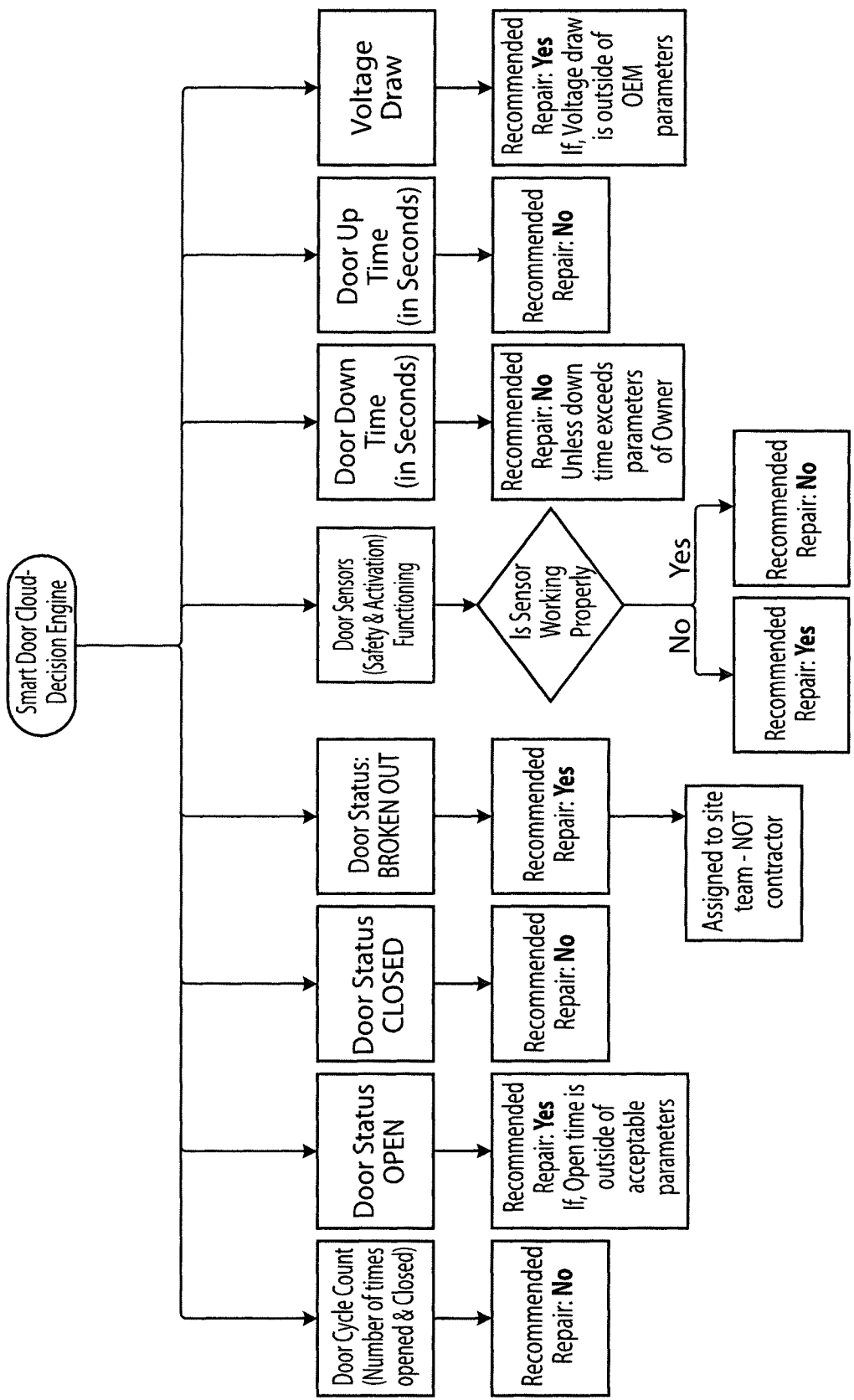
FIG. 10 is a decision tree illustrating an exemplary logical flow for analysis and determination of recommended actions and devices statuses based on input data regarding operation of one or more automatic mechanical devices in accordance with embodiments of the present invention.

Turning briefly to FIG. 10, an exemplary decision tree relating types of operational information input into one or more rules and/or algorithms to device statuses and recommended actions is illustrated. One of ordinary skill will appreciate that a variety of combinations of operational information types, device statuses and/or recommended actions may be implemented without departing from the spirit of the present invention.

Referring to step 107, the device statuses may be transmitted to one or more corresponding APIs of each respective customer CMMS. In one or more embodiments, all or some underlying or corresponding operational information and/or categorizations reflecting recommended providers and/or customer actions may be transmitted with the device statuses. The device statuses may be transmitted in batches, continuously and/or according to one or more event triggers. Exemplary event triggers include wherever an "Action Required" or "Maintenance Required Soon" flag has been generated. It should be noted that, wherever transmission and updates correspond to such event triggers, provider databases and/or the CMMS of the customer may maintain "Normal Operation" flags for automatic devices unless and until a device status with a different flag is received for one or more such automatic device(s).

As noted above, the device statuses for automatic devices requiring customer and/or provider action may be flagged with "Action Required" flags, the device statuses for automatic devices for which imminent customer and/or provider attention is suggested may be flagged with "Maintenance Required Soon" flags, and the device statuses for automatic devices without identified present or future needs may be flagged with "Normal Operation" flags.

Moreover, the device statuses may comprise and/or be accompanied by one or more broader maintenance programs. The maintenance programs may be determined based on historical performance and/or device statuses of the monitored devices of the customer in question and/or of other customers and systems. For example, such predictive maintenance programs may define annual, quarterly, weekly, or daily preventive maintenance inspections and adjustments based at least in part on historical operation information relating to the impacted customer's automatic device(s). The frequency and content of such inspections, adjustments and other predictive maintenance items may be determined based at least in part on usage volume of one or more of the automatic devices, the historical cycles on one or more of the automatic devices, and the quantity of abnormal device statuses determined or generated (e.g., fault or status codes that have occurred) therefore. Moreover, predictive maintenance reports may highlight specific automatic device issues—such as repeated failure/error/maintenance requirements. The reports may assist each customer in identifying problem units and understanding general maintenance expenses, and permit the customer to adjust replacement part inventories and the like to suit the needs of each commercial site.

Turning to FIG. 9, each customer CMMS may be configured to automatically accept provider recommendations and categorizations with respect to required provider and/or customer action at a commercial site. For example, each "Action Required" flag for an automatic device that is categorized by the provider for provider or third party action may be automatically converted to a purchase order or the like. Alternatively, the customer CMMS may require customer personnel assent or confirmation before such a purchase order is generated, such as where the customer is given flexibility to prioritize which automatic devices and/or device errors are worth addressing with a purchase order, or where the customer is given flexibility to determine whether all or some device errors may be better addressed by customer personnel at the commercial site.

Customer personnel and/or the CMMS may also participate in populating and/or revising the contents of a purchase order generated based at least in part on the device status(es) received from the provider. For example, customer personnel and/or the CMMS may select from a list of third party providers pre-populated based at least in part on identified device error(s), geographic proximity, or the like. For another example, customer personnel and/or the CMMS may identify preferred date(s) and time(s) for a service call. It should be noted that a variety of customizations in the flow of purchase order generation, revision, transmission and/or confirmation are possible within the scope of the present invention.

Referring to step 108, a service appointment may be scheduled and/or repair instructions may be transmitted for one or more actionable devices status(es). Turning again to FIG. 9, the CMMS may issue the purchase order to the provider or a third party service provider, which may confirm or negotiate the terms of such purchase order with the customer and subsequently perform the required service. Alternatively or prior to performance of such a service, the customer may attempt to address the need with customer personnel at the commercial site.

In one or more embodiments, the CMMS transmits instructional materials received from the provider (as discussed in more detail above) to the customer personnel in support of repair attempts or other required maintenance. For example, an actionable device status may indicate that an automatic door device has "broken out"—i.e., where the door has been knocked off its door frame side guides and a breakout switch has consequently been triggered or a corresponding device status has been generated through analysis—and the CMMS and/or the provider may transmit instructional materials for remedying the break out condition to the customer personnel.

The method may include additional, less, or alternate steps and/or device(s), including those discussed elsewhere herein. For example, the database containing operational information, device statuses, recommended actions and the like for each customer may be accessed according to the network flow illustrated in FIG. 7. More particularly, each customer may securely access data for its corresponding automatic devices via the REST API interface—whereby access is controlled by OAuth certificates or the like—and CDN and Static Content Web Services, with the support of identification as a service (idaas) infrastructure. The customer may access current statuses for each automatic device, future needs for customer and/or provider action to maintain the automatic devices, present needs for customer and/or provider action, and/or instructional materials supporting remedial actions at the commercial site(s) by the customer personnel. The provider database may include contact information for recommended provider and/or third party personnel where recommended action involves same. The REST API interface may additionally permit the customer to automatically generate a purchase order or other request for services, and to cause transmission of same to the corresponding provider and/or third party, as discussed above and illustrated in FIG. 9.

Further, customer personnel may configure, customize or otherwise specify operation of IoT monitoring devices and/or related aspects of analyses, services and/or scheduling provided by the provider systems through access to the REST API interface. For example, the customer personnel may customize which conditions or device statuses should be treated as addressable by customer personnel, by provider personnel, and/or by third party personnel, may specify provider and/or third party personnel preferred for addressing one or more device statuses, or the like. Such configuration, customization and/or other specification may also or alternatively be achieved via a computing device comprising a mobile device and mobile application configured for secure access to provider systems and/or customer CMMS without departing from the spirit of the present invention. Still further, the computing device may be configured with one or more templates for report(s) reflecting operational information, device statuses, device profiles or the like stored in the provider database, the provider server(s) and/or the customer CMMS. The report template(s) may be optimized for printing or the like.

Additional Considerations

In this description, references to "one embodiment", "an embodiment", or "embodiments" mean that the feature or features being referred to are included in one or more embodiments of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A method of monitoring a plurality of automatic mechanical devices selected from at least one of automatic doors and automatic dock equipment located at a commercial site, each of the automatic mechanical devices including an integral controller with a communication port, the method comprising:
   installing, at the commercial site, a plurality of internet-of-things (IoT) monitoring devices, each of the IoT monitoring devices comprising—
      a plurality of connectors respectively corresponding to a plurality of data communication standards,
      a wireless transceiver configured to transmit operational information corresponding to data received at least in part over the plurality of connectors,
   selecting one of the plurality of connectors of each of the IoT monitoring devices that matches the communication port of a corresponding one of the plurality of automatic mechanical devices, the matching communication port being pre-configured for electronic communication according to one of the plurality of data communication standards;
   joining the selected one of the plurality of connectors of each of the IoT monitoring devices to the matching communication port of the integral controller of the corresponding one of the plurality of automatic mechanical devices to establish electronic communication;
   establishing a power supply for each of the IoT monitoring devices by joining a power supply circuit of each of the IoT monitoring devices to the integral controller of the corresponding one of the plurality of automatic mechanical devices so that the IoT monitoring device receives an electrical current comprising the power supply from the corresponding one of the plurality of automatic mechanical devices and the power supply circuit converts the voltage of the electrical current for powering the IoT monitoring device;
   assigning a plurality of device profiles respectively to the plurality of automatic mechanical devices, each of the plurality of device profiles corresponding to the respective joined connector and a combination of manufacturer and device model;
   receiving, over each one of the joined connectors, at least a portion of the data from the plurality of automatic mechanical devices, the data reflecting operational events and states of the plurality of automatic mechanical devices and the received portion including an integral controller error code; and
   transmitting, via the wireless transceivers of the plurality of IoT monitoring devices, the operational information of each of the plurality of automatic mechanical devices for analysis based at least in part on each corresponding device profile.

2. The method of claim 1, wherein respective ones of the joined connectors correspond to or comprise at least two of the following: recommended standard 232 (RS-232) and controller area network (CAN bus).

3. The method of claim 1, further comprising automatically encrypting at least a portion of the data from the plurality of automatic mechanical devices at each of the plurality of IoT devices for transmission as at least a portion of the operational information transmitted for analysis.

4. The method of claim 1, wherein—
   assignment of each of the plurality of device profiles includes—
      at the commercial site, establishing wireless electronic communication via the wireless transceiver of the corresponding IoT monitoring device with at least one remote server,
      receiving a user selection of the device profile,
      downloading software, from the at least one remote server to the corresponding IoT monitoring device, for refinement and/or conversion of the data received from the corresponding automatic mechanical device, the refinement and/or conversion being performed prior to transmission of the operational information.

5. The method of claim 4, further comprising receiving a portion of the data over one or more input/output (I/O) ports of each of the plurality of IoT monitoring devices.

6. The method of claim 5, wherein the portion of the data received over the one or more I/O ports of each of the plurality of IoT monitoring devices includes an electrical signal from a relay circuit, further comprising monitoring the electrical signal with general purpose input circuitry configured to monitor voltage levels of external wiring of the corresponding automatic mechanical device.

7. The method of claim 6, wherein the portion of the data received over the one or more I/O ports includes an electrical signal from a supplemental sensor installed with the IoT monitoring device.

8. The method of claim 7, wherein each of the plurality of device profiles embodies input from an installation technician supporting conversion and/or refinement of the portions of the data received over the one or more I/O ports.

9. The method of claim 1, further comprising—
receiving the operational information corresponding to the plurality of automatic mechanical devices,
retrieving the device profile corresponding to each of the plurality of automatic mechanical devices,
analyzing the operational information corresponding to the plurality of automatic mechanical devices at least in part based on the corresponding device profile to determine a corresponding plurality of device statuses,
transmitting the plurality of device statuses, via at least one application programming interface (API), to respective ones of a plurality of computerized maintenance managements systems corresponding to the plurality of commercial sites.

10. The method of claim 9, wherein determination of a first device status of the plurality of device statuses, with respect to a first automatic device of the plurality of automatic devices, includes analyzing first and second portions of the operational information corresponding to first and second portions of the data, wherein the first and second portions of the data were received from the first automatic device and a second automatic device of the plurality of automatic devices.

11. A system for monitoring a plurality of automatic mechanical devices selected from at least one of automatic doors and automatic dock equipment and located across a plurality of commercial sites, each of the automatic mechanical devices including an integral controller with a communication port pre-configured for electronic communication according to a controller data communication standard, the system comprising:
a plurality of internet-of-things (IoT) devices installed at respective ones of the plurality of commercial sites, each IoT device comprising—
a plurality of connectors respectively corresponding to a plurality of data communication standards, one of the plurality of connectors being matched to the communication port and controller data communication standard of a corresponding integral controller of one of the plurality of automatic mechanical devices, the one of the plurality of connectors being joined and in electronic communication with the integral controller of the corresponding one of the plurality of automatic mechanical devices at the matched communication port,
a wireless transceiver configured to transmit operational information corresponding to data received at least in part over the plurality of connectors, the received data including an integral controller error code,
a power supply circuit in electrical communication with and receiving power supplied from the integral controller of the corresponding one of the plurality of automatic mechanical devices, whereby the IoT device receives an electrical current comprising the power supply from the corresponding one of the plurality of automatic mechanical devices and the power supply circuit converts the voltage of the electrical current to power the IoT device;
at least one data processing server in electronic communication with the plurality of IoT devices, the at least one data processing server comprising a processing element and a non-transitory computer-readable medium storing program instructions that, when executed by the processing element, cause the at least one processing server to —
receive the operational information corresponding to the plurality of automatic mechanical devices and transmitted according to the plurality of data communication standards,
retrieve a device profile corresponding to each of the plurality of automatic mechanical devices, each of the plurality of device profiles corresponding to the respective joined connector and a combination of manufacturer and device model,
analyze the operational information corresponding to the plurality of automatic mechanical devices at least in part based on the corresponding device profiles to determine a plurality of device statuses,
transmit the plurality of device statuses, via at least one application programming interface (API), to respective ones of a plurality of computerized maintenance managements systems corresponding to the plurality of commercial sites.

12. The monitoring system of claim 11, wherein respective ones of the joined connectors correspond to or comprise at least two of the following: recommended standard 232 (RS-232) and controller area network (CAN bus).

13. The monitoring system of claim 11, wherein each IoT device further comprises a processing element and a non-transitory computer-readable medium storing program instructions that, when executed by the processing element of the IoT device, cause the IoT device to automatically encrypt a portion of the data from the corresponding one of the plurality of automatic mechanical devices for transmission as at least a portion of the operational information transmitted for analysis.

14. The monitoring system of claim 11, wherein the program instructions, when executed by the processing element, further cause the at least one processing server to receive a plurality of remote selections by an installation technician located at each of the commercial sites, each of the plurality of selections linking one of the plurality of device profiles to a respective one of the IoT devices.

15. The monitoring system of claim 11, wherein each of the plurality of IoT devices further comprises one or more input/output (I/O) ports configured to receive a portion of the data.

16. The monitoring system of claim 15, wherein the one or more I/O ports of each of the plurality of IoT monitoring devices is/are configured to receive the portion of the data in the form of an electrical signal from a relay circuit, further comprising general purpose input circuitry configured to monitor voltage levels of external wiring of the corresponding automatic mechanical device and thereby receive the electrical signal.

17. The monitoring system of claim 16, wherein the one or more I/O ports of each of the plurality of IoT monitoring devices is/are further configured to receive the portion of the data in the form of an electrical signal from a supplemental sensor installed with the IoT monitoring device.

18. The monitoring system of claim 17, wherein each of the plurality of device profiles embodies input from an installation technician supporting conversion and/or refinement of the portion of the data received over the one or more I/O ports.

19. The monitoring system of claim 11, wherein determination of a first device status of the plurality of device statuses, with respect to a first automatic device of the plurality of automatic devices, includes analyzing first and second portions of the operational information corresponding to first and second portions of the data, the first and second portions of the data having been received from the first automatic device and a second automatic device of the plurality of automatic devices.

20. The monitoring system of claim 19, wherein the first and second automatic devices of the plurality of automatic devices are linked in respective ones of the plurality of device profiles based on one or more of the following shared characteristics at a commercial site of the plurality of commercial sites operated by a customer: proximate locations; locations in one or more areas assigned by the customer for the same or similar types and/or volumes of workload; locations in one or more areas assigned by the customer for use with one client; locations in one or more areas assigned by the customer for use with a plurality of similar clients; locations in one or more areas assigned by the customer for use with one good type; locations in one or more areas assigned by the customer for use with a plurality of similar good types; locations in one or more areas expected to be worked and/or overseen by the same or similar personnel; and locations in one or more areas subjected to the same or similar physical and/or environmental conditions.

* * * * *

UNITED STATES PATENT AND TRADEMARK OFFICE
CERTIFICATE OF CORRECTION

| | |
|---|---|
| PATENT NO. | : 11,308,019 B2 |
| APPLICATION NO. | : 16/877786 |
| DATED | : April 19, 2022 |
| INVENTOR(S) | : Maloney et al. |

It is certified that error appears in the above-identified patent and that said Letters Patent is hereby corrected as shown below:

In the Claims

Claim 1 at Column 26, Lines 22-27, delete the following text: "so that the IoT monitoring device receives an electrical current comprising the power supply from the corresponding one of the plurality of automatic mechanical devices and the power supply circuit converts the voltage of the electrical current for powering the IoT monitoring device"

Claim 11 at Column 28, Lines 7-12, delete the following text: ", whereby the IoT device receives an electrical current comprising the power supply from the corresponding one of the plurality of automatic mechanical devices and the power supply circuit converts the voltage of the electrical current to power the IoT device"

Signed and Sealed this
Seventh Day of June, 2022

*Katherine Kelly Vidal*

Katherine Kelly Vidal
*Director of the United States Patent and Trademark Office*